Oct. 30, 1923.

J. D. WATSON

SHUTTLE THROWING DEVICE

Filed May 28, 1921

1,472,260

INVENTOR.
John D. Watson
BY
HIS ATTORNEYS.

Patented Oct. 30, 1923.

1,472,260

UNITED STATES PATENT OFFICE.

JOHN D. WATSON, OF APPLETON, WISCONSIN.

SHUTTLE-THROWING DEVICE.

Application filed May 28, 1921. Serial No. 473,536.

*To all whom it may concern:*

Be it known that I, JOHN D. WATSON, a citizen of the United States, residing at Appleton, in the county of Outagamie and State of Wisconsin, have invented certain new and useful Improvements in Shuttle-Throwing Devices, of which the following is a specification, reference being had therein to the accompanying drawings.

This invention relates to a shuttle-throwing device, and the object of the invention is the construction of a simple and efficient device for Fourdrinier wire weaving loom, which permits of much finer adjustment than anything heretofore used, by the use of a short lever supported by a shaft and to which short lever is attached a spring, the tension of which spring is manually controlled.

With the foregoing and other objects in view, my invention comprises certain novel combinations, constructions and arrangements of parts as will be hereinafter described, illustrated in the accompanying drawings, and more particularly pointed out in the appended claim.

Figure 1:
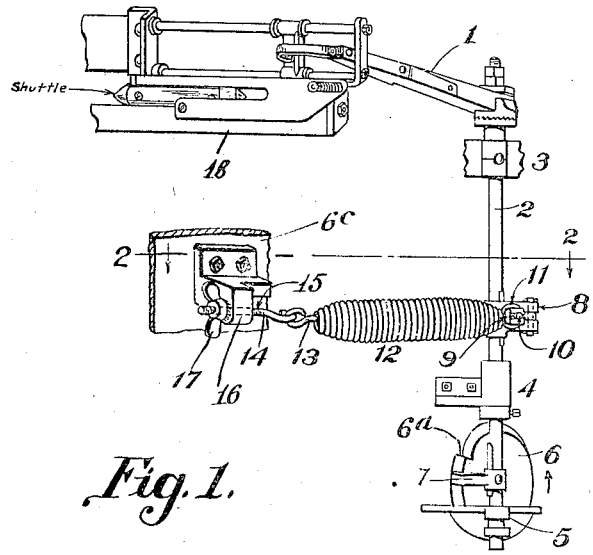
Figure 1 is a perspective view of a device constructed in accordance with the present invention.

Referring to the drawings by numerals, 1 designates the picker stick which throws the shuttle, and this stick is supported upon the vertical shaft 2. Shaft 2 is mounted in bearing brackets 3, 4 and 5. A cam 6 provided with a V-shaped notch 6ª is positioned contiguous to vertical shaft 2, and a cam-dog 7 cooperates with cam 6; cam-dog 7 being secured upon shaft 2. Cam 6 is secured to shaft 6ᵇ; said shaft 6ᵇ is journaled in loom frame 6ᶜ.

Figure 2:
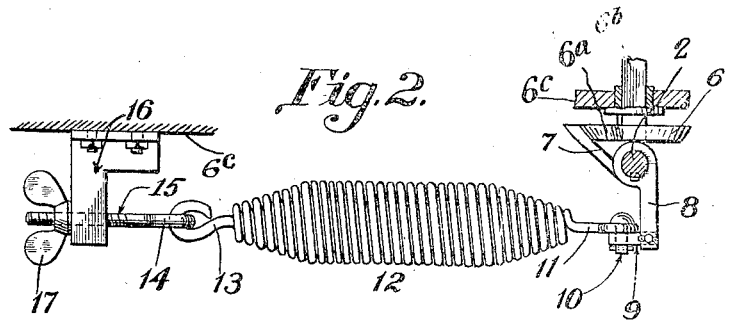
Figure 2 is a view, taken on line 2—2, Fig. 1, and looking in the direction of the arrows.

A bifurcated, short puller lever 8 is keyed upon the vertical picker shaft 2, and in the outer bifurcated end of shaft 8 is pivotally secured lug 9. Mounted in the outer end of lug 9 is a bolt 10, and secured at its inner end 11, upon bolt 10, is coil spring 12. The outer end 13 of spring 12 is retained in the eye 14 of bolt 15; the bolt 15 extends through flange or bracket 16 on the side of the loom, and on the outer end of the bolt is threaded a butter-fly nut 17. By referring particularly to Fig. 2, it will be noted that the lug 9 is pivotally connected to the bifurcated end of the pull lever 8, so as to be able to swing in a horizontal plane, when necessary, while the bolt 10 extends through the lug 9 in a horizontal manner also. However, the end 11 of the spring 12 is connected to the bolt so that the spring may swing vertically if necessary. In this manner, the connections mentioned form a universal joint, so that when the device is in use the little vibrations and strains and stresses will all be taken up by the specific connection mentioned without imparting any bending, twisting or other injurious effects to the device. The bolt 15 and the nut 17 also allow of an easily and quickly, as well accurately, adjustable connection for the spring, as hereinbefore explained.

My device allows the finest adjustment one may desire because of the principle of the screw or bolt 15 and the butterfly nut being used, whereby simply tightening or loosening the nut can change the tension of spring 12. Owing to the shortness of the puller lever 8, on the picker shaft 2, and the length of the picker stick 1, the extension or expansion and contraction of the spring 12 in action is slight, consequently, the greatest force of the blow is at the start of the stroke when the greatest force is needed in dislodging the shuttle from the grip of the box and getting it under way, and the force is practically spent when the picker stick registers its limit in delivering the shuttle in the shed.

It is to be understood that cam 6 (known as a picker cam) is fastened to an end of shaft 6ᵇ, which shaft 6ᵇ runs through the loom from side to side, and on each end of said shaft is a cam 6. The arm or dog 7 drops into the notch 6ª, as the cam 6 revolves, and by reason of the dog 7 moving from the bevel surface of the cam into notch 6ª, and then out of the notch, this results in the action of the spring 12 and the quick, sharp twist of the shaft with the picker stick to throw the shuttle.

This principle might apply to many, or any and all kinds of weaving, but more particularly to wire cloth weaving and especially "Fourdrinier" wire weaving, the latter being that grade of wire cloth used in making paper, and is made in an endless belt form to travel on the "Fourdrinier" machine.

The lower end of the picker block comes in contact with the end of the shuttle and the picker stick pushing against the picker block which in turn slides on the rods, gives the momentum to the shuttle to carry it through the shed.

While I have described the preferred embodiment of my invention, and have illustrated the same in the accompanying drawings, certain minor changes or alterations may appear to one skilled in the art to which this invention relates, during the extensive manufacture of the same and I, therefore, reserve the right to make such alterations or changes as shall fairly fall within the scope of the appended claim.

What I claim is:

A structure for controlling rotation of a rocker shaft, said structure comprising a lever arm for fitting upon the shaft and extending transversely from the shaft and having swinging movement when the shaft is rotated, a lug pivotally connected with the free end portion of said arm and extending transversely therefrom for swinging movement in a plane parallel to the plane in which the arm swings and longitudinally thereof, a bracket adapted to be mounted in spaced relation to one side of said arm and beyond the free end of said lug, a coiled spring having an eye at one end, a pivot pin passing through said eye and through said lug to pivotally mount the spring at one side of said lug for swinging movement in a plane at right angles to the swinging movement of the arm and lug, an eye bolt loosely connected with the other end of said spring and extending through said bracket, and a securing nut upon said eye bolt engaging the bracket to retain the spring at a desired tension.

In testimony whereof I hereunto affix my signature.

JOHN D. WATSON.